(12) United States Patent
Kersey et al.

(10) Patent No.: US 11,998,062 B2
(45) Date of Patent: Jun. 4, 2024

(54) CONNECTIVITY INTERMEDIARY

(71) Applicant: Nicoventures Trading Limited, London (GB)

(72) Inventors: Robert Kersey, London (GB); Darryl Baker, London (GB); Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 477 days.

(21) Appl. No.: 17/309,722

(22) PCT Filed: Dec. 17, 2019

(86) PCT No.: PCT/GB2019/053574
§ 371 (c)(1),
(2) Date: Jun. 16, 2021

(87) PCT Pub. No.: WO2020/128450
PCT Pub. Date: Jun. 25, 2020

(65) Prior Publication Data
US 2022/0030955 A1    Feb. 3, 2022

(30) Foreign Application Priority Data
Dec. 17, 2018    (GB) .................................... 1820545

(51) Int. Cl.
*A24F 40/65*    (2020.01)
*H04W 4/70*    (2018.01)
(Continued)

(52) U.S. Cl.
CPC .............. *A24F 40/65* (2020.01); *H04W 4/70* (2018.02); *H04W 4/80* (2018.02); *H04W 12/06* (2013.01); *H04W 76/12* (2018.02)

(58) Field of Classification Search
CPC .......... A24F 40/65; H04W 4/70; H04W 4/80; H04W 12/06; H04W 76/12; H04W 88/18
See application file for complete search history.

(56) References Cited

U.S. PATENT DOCUMENTS

2015/0224268 A1    8/2015  Henry et al.
2016/0081393 A1    3/2016  Black
(Continued)

FOREIGN PATENT DOCUMENTS

WO    WO 2014066730 A1    5/2014
WO    WO 2018/202651 A1    11/2018

OTHER PUBLICATIONS

International Search Report and Written Opinion, International Application No. PCT/GB2019/053574, dated Apr. 23, 2020, 15 pages.

*Primary Examiner* — Jean F Duverne
(74) *Attorney, Agent, or Firm* — BURR & FORMAN LLP

(57) ABSTRACT

A connectivity dongle for providing connectivity between an aerosol delivery device and a management service. The connectivity dongle comprises a wireless connectivity interface configured to establish a wireless data connection to an aerosol delivery device to receive data from the aerosol delivery device; and a data connectivity interface configured to establish a network connection to the management service and to pass data received from a connected aerosol delivery device to the management service via the network connection. In some embodiments, each aerosol delivery device may comprise an electronic nicotine delivery "END" device.

21 Claims, 3 Drawing Sheets

(51) Int. Cl.
*H04W 4/80* (2018.01)
*H04W 12/06* (2021.01)
*H04W 76/12* (2018.01)

(56) References Cited

U.S. PATENT DOCUMENTS

2017/0332702 A1* 11/2017 Cameron .................. A24F 40/65
2018/0132529 A1*  5/2018 Sur ....................... H05B 1/0244
2019/0089180 A1*  3/2019 Sur ....................... H02J 7/00041

* cited by examiner

CONNECTIVITY INTERMEDIARY

PRIORITY CLAIM

The present application is a National Phase entry of PCT Application No. PCT/GB2019/053574, filed Dec. 17, 2019, which claims priority from Great Britain Application No. GB1820545.0, filed Dec. 17, 2018, each of which is hereby fully incorporated herein by reference.

TECHNICAL FIELD

The present disclosure relates to method and apparatus for providing a connectivity intermediary, and in particular but not exclusively to a connectivity dongle for providing connectivity between an electronic nicotine delivery device and a management service.

BACKGROUND

Some electronic nicotine delivery "END" devices can include a data connectivity interface to enable diagnostic and/or usage information to be provided by the END device to a management service. Such an interface can also be used to provide settings updates and the like to the END device.

In the field of END devices, WO2014/066730A1 describes an electronic cigarette and US2016/0081393A1 describes a personal vaping device.

SUMMARY

Some specific aspects and embodiments are set out in the appended claims.

Viewed from a first aspect, there can be provided a connectivity dongle for providing connectivity between an electronic nicotine delivery "END" device and a management service, the connectivity dongle comprising: a wireless connectivity interface configured to establish a wireless data connection to an END device to receive data from the END device; and a data connectivity interface configured to establish a network connection to the management service and to pass data received from a connected END device to the management service via the network connection. Thereby, an END device equipped with a short range low power wireless facility is enabled for access to a network connected management service. By providing a dongle in this way, the present approaches enable an END device to be able to exchange information with a management service without a need for physical docking of the END device to a suitable connected docking station, without a need for linking the END device via mobile device (such as a smartphone, tablet, phablet or laptop) equipped with a suitable information synchronisation application, and without a need for the END device to have a high power drain wireless interface and inbuilt connectivity application for direct connection to a network access point. Thus a user of an END device may own a dongle for use with their own domestic internet connection access point, such that any END device with corresponding functionality can sync to the dongle whenever the END device comes in to range Viewed from another aspect, there can be provided an END device management environment comprising such a connectivity dongle and a management service.

Viewed from a further aspect, there can be provided a method of communicating data comprising: collecting, during use, information describing operation of an electronic nicotine delivery "END" device; establishing, when the END device is within range of a connectivity dongle, a wireless data connection from the END device to the connectivity dongle; transmitting the collected information from the END device to the connectivity dongle via the wireless data connection; establishing a data connection from the connectivity dongle to a network-accessible management service via a router providing access to the network; transmitting the collected information from the connectivity dongle to the management service via the data connection; and storing the collected information at the management service. Thereby, an END device equipped with a short range low power wireless facility is enabled for access to a network connected management service.

BRIEF DESCRIPTION OF THE DRAWINGS

Embodiments of the present teachings will now be described, by way of example only, with reference to accompanying drawings, in which.

Figure 1:
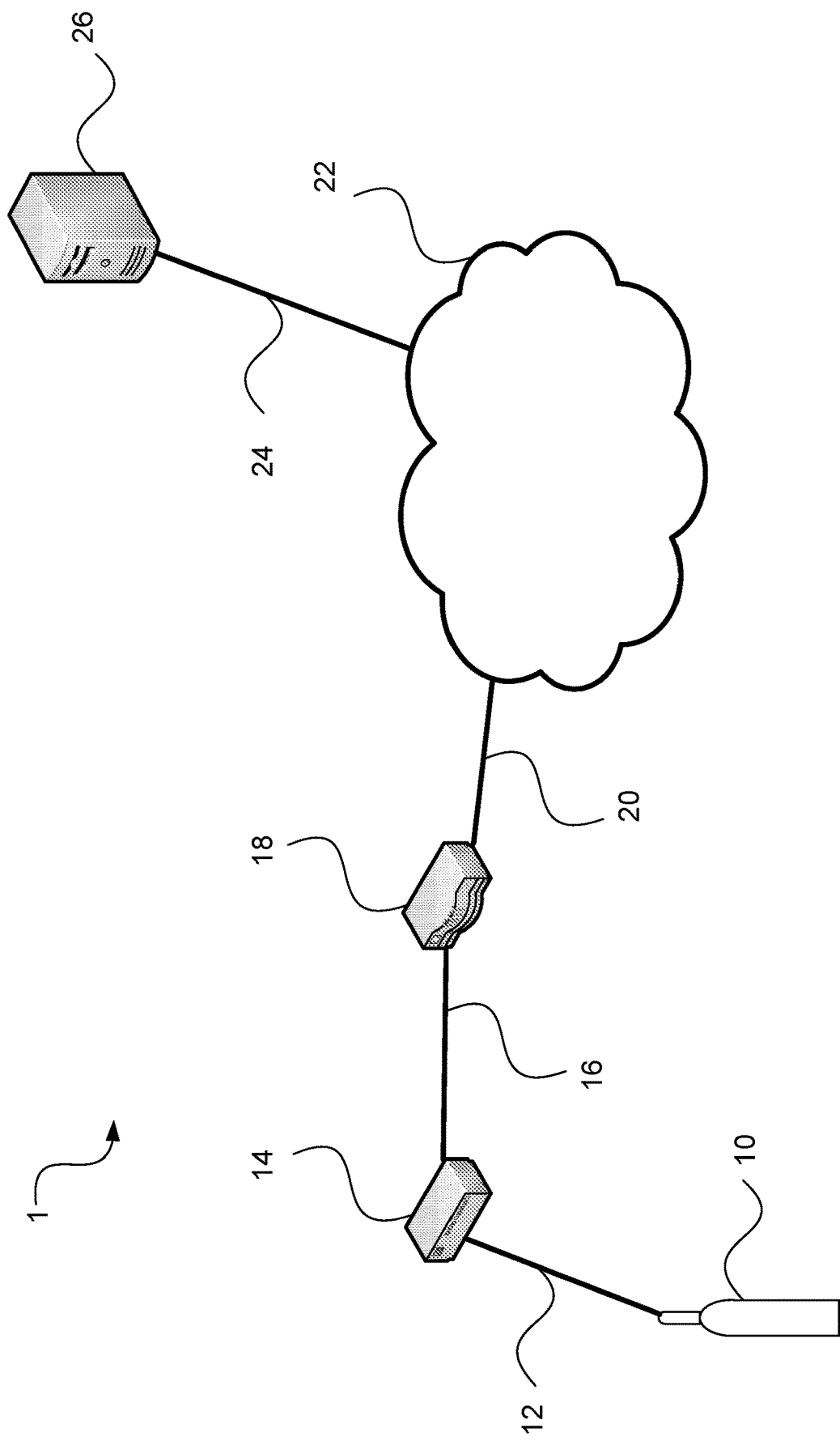
FIG. 1 schematically illustrates a connected system.

While the presently described approach is susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope as defined by the appended claims.

DETAILED DESCRIPTION OF THE DRAWINGS

The present examples set out approaches for providing connectivity between an END device and a network access point, via a base station, hub, dongle or other connectivity device, referred to herein as a dongle. In some examples, onward connectivity may be provided from the network access point to a management system.

FIG. 1 shows an example of a connected system in which an END device 10 has a data connection 12 with a dongle 14. The data connection 12 may be a wireless connection, where a wireless connection may provide convenience of access to the dongle 14 without the need for physically connecting a wired connector. The data the connection 12 may by intermittent in the sense that it may be active when the END device 10 is within range of the dongle 14 and inactive when such range is exceeded. The data connection 12 may also be intermitted in the sense that it may be triggered only at certain times, which may be based upon a connection schedule of either or both of the END device 10 and dongle 14, or when a connect mode is activated at the END device 10 or dongle 14.

In some examples, the dongle 14 may also function as a charger station for the END device 10, which may provide for wired or wireless charging of one or batteries within the END device 10.

The data connection 12 may use a low power consumption wireless technology so as to avoid excessive power drain on the END device 10 caused by connection to the dongle 14. Examples of suitable wireless technologies for the data connection 12 may include Bluetooth™ Bluetooth Low Energy™ ("BLE") formerly known as Bluetooth Smart, Zigbee™, LoRa or SigFox, although other low power wireless technologies such as other Personal Area Network or other LPWAN technologies could be used.

As further illustrated in FIG. 1, the dongle 14 has a data connection 16 with an access point 18. The access point 18 may be a router or other device providing access to the internet, such as a cable modem, and ADSL router, a fixed line router or the like. The data connection 16 may be wired or wireless, for example based upon a networking infrastructure such as Ethernet or Wi-Fi. The access point 18 may provide network access control technologies such as a firewall and other perimeter protection technologies. Where the data connection 16 is a wireless using Wi-Fi, the dongle 14 may be provided with the ability to connect to a Wi-Fi access point (which may be part of a single physical device making up the access point 18 or may be part of a distributed arrangement of multiple physical devices which collectively provide the functionality of access point 18) using Wireless Protected Setup (WPS) to establish the Wi-Fi connection. Thus the dongle 14 may be provided with the ability to create the Wi-Fi connection without needing a locally accessible or Ethernet-accessible user interface of the dongle 14 to be set up for operation. In some examples a locally accessible or Ethernet-accessible user interface of the dongle 14 may also be provided to enable settings of the dongle 14 to be viewed and changed.

Referring again to FIG. 1, the access point 18 has a data connection 20 with a network 22. In the present examples, the network 22 is the Internet, but in alternative implementations this could be a Wide Area Network or other dedicated network arrangement.

Additionally illustrated in FIG. 1 is a management service 26 connected to the network 22 via a data connection 24. The data connection 24 may include appropriate network access technologies such as perimeter protection to impede unwanted access from the network 22 to the management service 26. The management service 26 may be hosted by one or more physical or virtual servers which may be located at a facility of a provider of the management service 26 or may be hosted as a so-called cloud service.

Within the structure shown in FIG. 1, the END device 10 may be capable of communicating with the dongle 14 to provide diagnostic information and/or usage information from the END device 10 to the dongle 14. The dongle 14 may store such received information for forwarding to the management service 26. The dongle may also store update information such as settings information or firmware updates, and then communicate these to the END device 10. As mentioned above, this exchange of information may occur whenever the END device 10 and dongle 14 are powered-on and in range of one another, or alternatively may occur when one or other device activates the data connection 12 according to a schedule or when triggered by a user (such as using a connection initiation control on the END device 10 or dongle 14).

Figure 2:
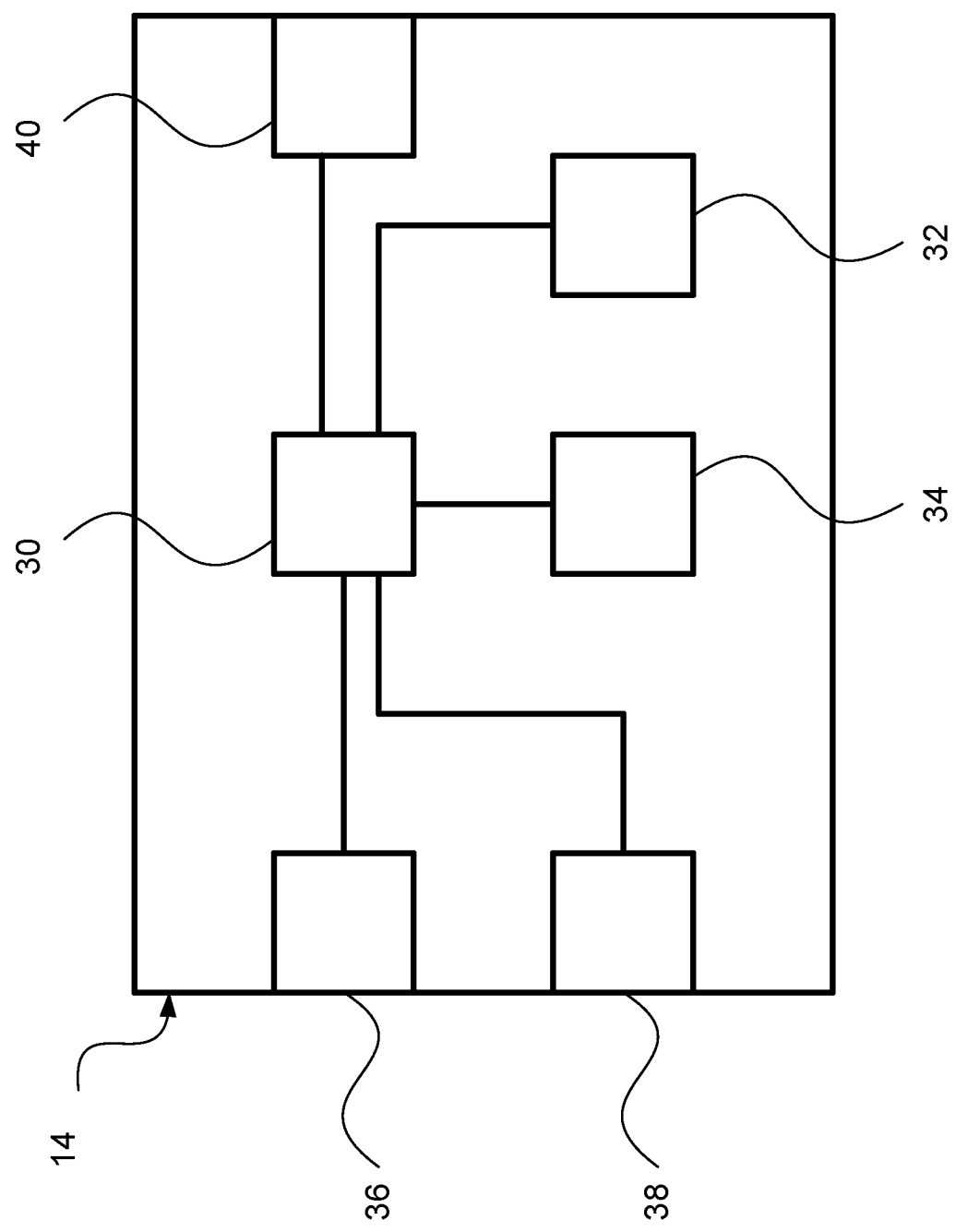
FIG. 2 schematically illustrates a logical structure of a dongle.

An example schematic structure of a dongle 14 is shown in FIG. 2. In this example, the dongle 14 includes a processor 30, connected to program memory 32 which stores the operation instructions for the dongle 14 and data memory 34 which stores information received from the END device 10 or management service 26. The program and data memories may be physically separate or may be different logical storage locations within the same physical memory device.

The dongle 14 as illustrated in FIG. 2 also has a wireless communication interface 36 which provides for the data connection 12 between the dongle 14 and the END device 10. This wireless communication interface 36 may support data connections to multiple END devices 10, either as multiple simultaneous connections or as one connection shared over time between multiple END devices.

The dongle 14 as illustrated in FIG. 2 also has an upstream data connection interface 38 which provides for the data connection 16 between the dongle 14 and the access point 18. This upstream data connection interface 38 may be wired and/or wireless according to the required connectivity technology to link to the access point 18.

The dongle 14 as illustrated in FIG. 2 also includes an optional sync input control element 40. This may be a button or other input device to enable a user to commence activation of the data connection 12 to an END device 10 for exchange of information therewith. Such exchange of information may be referred to as synchronisation operation. In some examples such a sync input control element 40 may have additional or alternative functionality to commence establishment of a data connection relationship with one or more END devices. In the example of a Bluetooth-based wireless connectivity approach, such establishment of a data connection relationship may be referred to as pairing. Once such a data connectivity relationship has been established, the END device and dongle may store properties of the relationship such that a connection can be re-established on future occasions without a need to re-pair.

By providing a dongle in this way, the present approaches enable an END device to be able to exchange information with a management service without a need for physical docking of the END device to a suitable connected docking station, without a need for linking the END device via mobile device (such as a smartphone, tablet, phablet or laptop) equipped with a suitable information synchronisation application, and without a need for the END device to have a high power drain wireless interface and inbuilt connectivity application for direct connection to a network access point. Thus a user of an END device may own a dongle for use with their own domestic internet connection access point, such that any END device with corresponding functionality can sync to the dongle whenever the END device comes in to range.

Thus, for example a user's END device may record any diagnostic information and/or usage information that it is configured to save during one or more periods of absence away from the dongle, and then establish the data connection with the dongle once it returns to being within range of the dongle to permit that information to be transferred to the dongle. The dongle may transfer that information to the management service at any suitable time, which may be upon receipt or may be at a later time based upon availability of data connection through to the management service and/or a schedule for data transfer.

For the return path, at a time which may be determined at the management service and/or as a responsive communication to some data received from the dongle, the management service may provide a settings update and/or updated firmware to the dongle. Providing the updates in response to some data received from the dongle may permit the management service to target updates for a particular END device 10 to a dongle 14 which currently has a data connection to that END device and therefore may facilitate a user of an END device using multiple dongles at different times while still receiving updates at the earliest possible time. In other examples a user may have a pre-registered "home" dongle to which all updates are provided, even if that user also connects their END device to another dongle for sending usage and/or diagnostic information. The dongle may buffer the received updates for inward transmission to the END device is the data connection to the END device is active, or store the received updates from the management service until a next connection with the END device, at which time the updates may be provided to the END device.

In another example, a vendor location such as an END vendor or a retail outlet such as a coffee shop or the like may operate a dongle for use by customers. Thus a user of an END device may be able to benefit from a dongle without having their own dongle, or alternatively when not near their own dongle.

To provide for data integrity and security, the dongle may be provided with the capability (for example under control of the processor 30 using program instructions found in program memory 32) to establish a protected connection to the management service 26. Examples of suitable protected connections may include a VPN or other secure tunnelling approach, or may include individual data encryption using a public/private key pair, or may include error correction coding to provide for correction of any data corruption that occurs during transmission, or a combination of the above. Thus the user of the END device may be assured that any data transmitted from the dongle to which they have connected is protected en-route to the management service 26.

As regards the data passing from the END device to the dongle, this may be protected using some form of data encryption for being passed between the END device and the dongle. Technologies such as Bluetooth-based technologies can support data encryption for securing such connections. In the alternative, the data may be anonymised and abstracted in such manner as to be meaningless without access to corresponding identification information held by the management service. For example, the data may include a simple data set such as a unique identifier of the device and a series of data values that are transmitted according to a predefined data schema which includes data values in known positions such that the data need not include field identifiers.

In the case that the data is encrypted as between the END device 10 and the dongle 14, the data may be stored in encrypted form by the dongle 14 pending onward transmission to the management service. In this situation, the dongle 14 may not store or have access to the unencrypted data. Such an implementation may be useful in any implementation but may have particular utility for a dongle that will be shared between END devices of multiple users.

Figure 3:
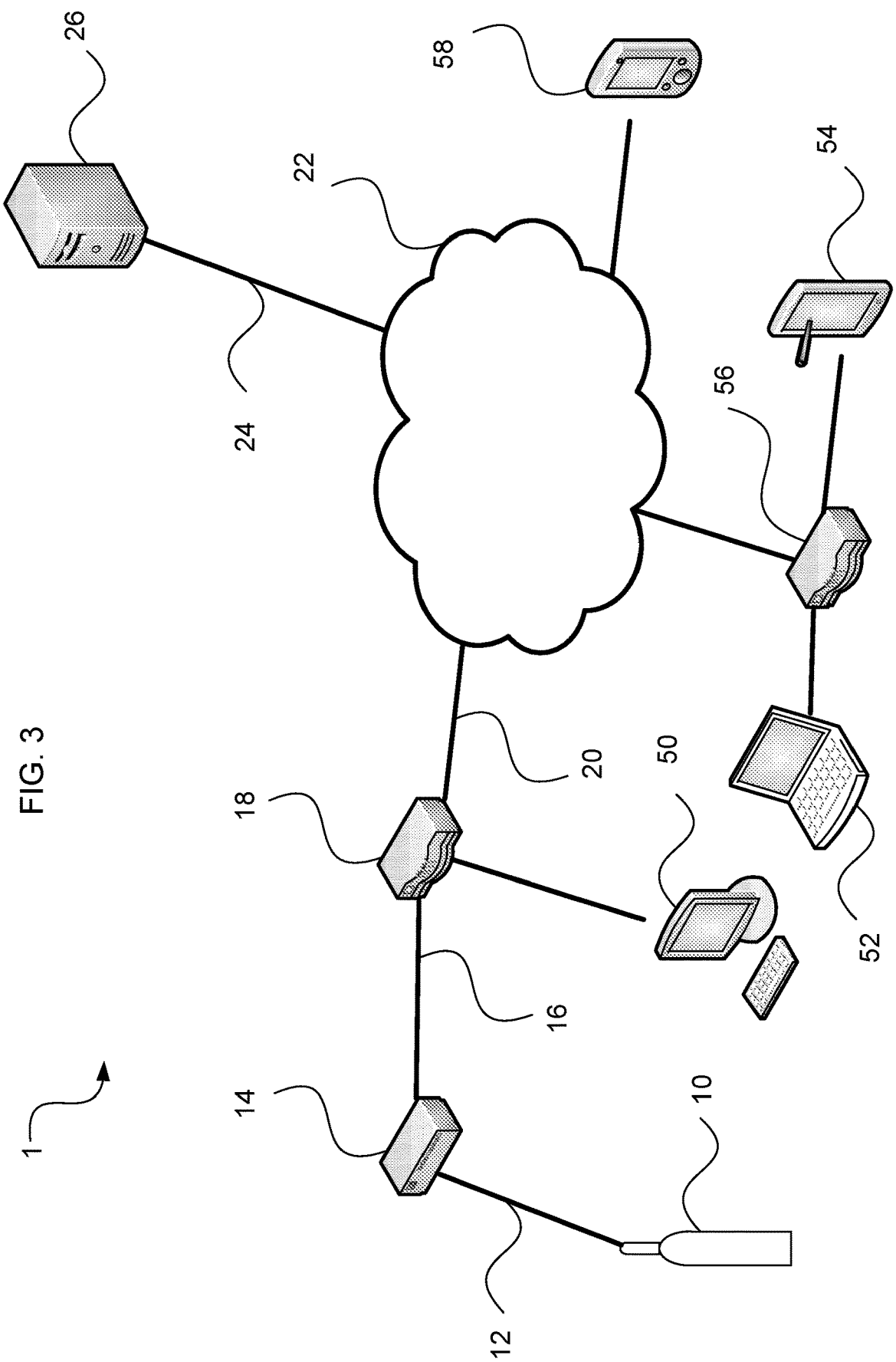
FIG. 3 schematically illustrates a connected system.

FIG. 3 shows a modified implementation in which a user interface for user interaction with the management service may be provided for access via a connected device of the user.

As illustrated in FIG. 3, a user may be provided with one or more devices capable of accessing the network 22. By way of example, these can include a computer terminal 50 which may access the network 22 via the access point 18, or a portable computer 52 or table computer 54 which in FIG. 3 are illustrated accessing network 22 via another access point 56, or a smartphone or phablet 58 which is illustrated having a direct connection into the network 22.

Using such a device, a user may access a user interface of the management service 26 through which the user can access, view or manage a user account associated with the user and any END device registered to that user's account. Such access may be by way of a web interface published by the management service 26 such that the user may access the interface using a web browser and conduct login and browse activities with the interface. The access may alternatively or additionally be via a device interface such as a published API which may permit use of a dedicated application which provides for the user to access the user interface of the management service 26.

The user interface of the management service, according to the present examples, provides for the user to access information gathered from the END device as well as to update settings information for the END device. In other implementations, the user interface may provide only one of these types of access, or separate user interfaces may be provided for the different types of access.

The ability to access information gathered from the END device, in addition to providing transparency to the user as to the data gathered, also provides that the user can easily see details of any relevant diagnostics. Such diagnostic information may include, for example, periods during which the END device had low battery and thereby provide information to the user about a need for more frequent charging of the device. Other example relevant diagnostic information may include information about when the user has tried to use an END device during a low nicotine reservoir condition such that the device was unable to provide an expected nicotine aerosol for delivery to the user.

Further, the ability to access information gathered from the END device also provides that the user can easily see usage information. This may for example be helpful to a user who is aiming to manage their END usage, for example as part of an effort to reduce personal nicotine dependency or to migrate away from other forms of nicotine delivery which the user considers to be undesirable.

As noted above, the user interface of the management service also provides in the present examples for the user to be able to manage settings information for the END device. Thus the user may be able to alter settings for the END device, such as power/strength. Other settings which could be altered might include, for an END device equipped with a light emitter such as an LED, the actions during which the light emitter is activated, and for an END device equipped with a multicolour light emitter such as a multicolour LED, the colour to be emitted for a given action. For example the END device could be configured to emit a first light colour when being activated for nicotine delivery and a second colour when establishing a data connection to a dongle.

Other settings changes that could be effected through the user interface include updating settings that relate to interchangeable parts of the END device. For example if the END device has a replaceable reservoir, the settings could be updated to inform of a concentration of the reservoir. This would then enable the management service to automatically update power settings to ensure that a nicotine delivery concentration is maintained despite the new reservoir having a different concentration to a previous reservoir.

Thus it is seen that by use of the presently described approaches a user may be provided with a convenient approach for information collection from and settings provision to an END device, without the user needing to link the END device through a dedicated smartphone app or similar.

Where a user has multiple END devices associated with a single user account, access to that user account may provide for access to data from and/or settings for all associated END devices.

In the above examples, the dongle 14 has been described by way of having functionality tailored to the END device information and settings exchange approach. In some examples, the dongle 14 may be a dedicated device for END synchronisation. As noted above this could take the form of a charger station for the END device but the dongle could also be a stand-alone dedicated device. In other implementations, the dongle 14 may have other functionalities unrelated to the END device. For example the dongle may also provide functionality relating to smart home functionality or other home automation. Thus other devices such as automated curtain actuators, lighting controllers or HVAC controllers having a capability to communicate using the wireless communication interface could also receive control signals from the dongle, in which circumstance the dongle would also include functionality to communicate with or host corresponding smart home or home automation control functionality.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the disclosure scope defined by the claims or limitations on equivalents to the claims, and that other embodiments may be utilised and modifications may be made without departing from the scope and/or spirit of the claims.

Various embodiments of the claimed scope may suitably comprise, consist of, or consist essentially of, appropriate combinations of the disclosed elements, components, features, parts, steps, means, etc, other than those specifically described herein. In addition, this disclosure may include other concepts not presently claimed, but which may be claimed in future either in combination with or separately to the presently claimed features.

For instance, although the specification has been described with reference to electronic nicotine delivery "END" devices, it will be appreciated that the teaching of the specification might be also used with, more general, aerosol delivery devices which do not necessarily contain, or use, nicotine. In such more general aerosol delivery devices, the aerosol delivery device (which might in some embodiments comprise an electronic cigarette (e-cigarette), and/or an END device) may contain an aerosol precursor material, such as a reservoir of a source liquid containing a formulation, typically but not necessarily including nicotine, or a solid material such a tobacco-based product, from which an aerosol is generated for inhalation by a user, for example through heat vaporisation. Thus, an aerosol delivery device will typically comprise a vaporiser, e.g. a heating element, arranged to vaporise a portion of precursor material to generate an aerosol in an aerosol generation region of an air channel through the aerosol delivery device. As a user inhales on the device and electrical power is supplied to the vaporiser, air is drawn into the device through one or more inlet holes and along the air channel to the aerosol generation region, where the air mixes with the vaporised precursor material and forms a condensation aerosol. The air drawn through the aerosol generation region continues along the air channel to a mouthpiece opening, carrying some of the aerosol with it, and out through the mouthpiece opening for inhalation by the user.

The invention claimed is:

1. A connectivity dongle for providing connectivity between an aerosol delivery device and a management service, the connectivity dongle comprising:
a wireless connectivity interface configured to establish a wireless data connection to an aerosol delivery device to receive data from the aerosol delivery device; and
a data connectivity interface configured to establish a network connection to the management service and to pass data received from a connected aerosol delivery device to the management service via the network connection; and
a control element for establishing a data connection relationship with the aerosol delivery device to pair the connectivity dongle with the aerosol delivery device;
wherein the connectivity dongle is further configured to store properties of the relationship such that a connection can be re-established with the aerosol delivery device on future occasions without a need to re-pair the connectivity dongle with the aerosol delivery device.

2. The connectivity dongle of claim 1; wherein the data connectivity interface is further configured to receive data from the management service and wherein the wireless connectivity interface is configured to pass data from management service to the aerosol delivery device.

3. The connectivity dongle of claim 1; wherein the wireless connectivity interface is a Personal Area Network interface such as a Bluetooth, BLE or Zigbee interface, or a Low Power Wide Area Network interface such as LoRa or SigFox.

4. The connectivity dongle of claim 1; wherein the data connectivity interface comprises a wired and/or wireless interface for communication with a network access point.

5. The connectivity dongle of claim 1, further comprising functionality to communicate with or control a smart home or home automation device.

6. The connectivity dongle of claim 1, further comprising a charger for charging a docked or nearby aerosol delivery device.

7. The connectivity dongle of claim 1, not including a user interface for user interaction with the aerosol delivery device.

8. The connectivity dongle of claim 1, wherein the dongle does not include smartphone or general purpose computing functionality.

9. The connectivity dongle of claim 1, further configured to establish a secure connection to the management service before sending data to or receiving data from the management service.

10. The connectivity dongle of claim 1, wherein each aerosol delivery device comprises an electronic nicotine delivery "END" device.

11. An aerosol delivery device management environment comprising the connectivity dongle of claim 1 and the management service.

12. The aerosol delivery device management environment of claim 11, wherein the management service includes a user interface accessible to access data provided by an aerosol delivery device and settings relating to an aerosol delivery device.

13. The aerosol delivery device management environment of claim 11, wherein the aerosol delivery device management environment comprises an END device management environment.

14. The connectivity dongle of claim 1, wherein the data, from the aerosol delivery device, is anonymised and abstracted in such manner as to be meaningless without access to corresponding identification information held by the management service.

15. The aerosol delivery device management environment of claim 12, wherein the user interface is configured for allowing a user of the aerosol delivery device to alter settings for the aerosol delivery device.

16. The aerosol delivery device management environment of claim 15, wherein the settings comprises actions during which a light emitter from the aerosol delivery device is activated.

17. The aerosol delivery device management environment of claim 16, wherein the light emitter comprises a multicolour light emitter, and the settings comprises the colour to be emitted by the multicolour light emitter for an action.

18. A method of communicating data comprising:
collecting, during use, information describing operation of an aerosol delivery device;
establishing, when the aerosol delivery device is within range of a connectivity dongle, a wireless data connection from the aerosol delivery device to the connectivity dongle;
transmitting the collected information from the aerosol delivery device to the connectivity dongle via the wireless data connection;
establishing a data connection from the connectivity dongle to a network-accessible management service via a router providing access to the network;
transmitting the collected information from the connectivity dongle to the management service via the data connection; and
storing the collected information at the management service; wherein the method further comprises;
establishing a data connection relationship with the aerosol delivery device, using a control element from the aerosol delivery device, for pairing the connectivity dongle with the aerosol delivery device; and
storing properties of the relationship, at the connectivity dongle, such that a connection can be re-established with the aerosol delivery device on future occasions without a need to re-pair the connectivity dongle with the aerosol delivery device.

19. The method of claim 18, further comprising:
transmitting update data from management service to the connectivity dongle via the data connection;
storing the update data at the connectivity dongle until a wireless data connection is next established with the aerosol delivery device;
establishing, when the aerosol delivery device is within range of the connectivity dongle, a wireless data connection from the aerosol delivery device to the connectivity dongle;
transmitting the update data from the connectivity dongle to the aerosol delivery device via the wireless data connection.

20. The method of claim 18, further comprising:
publishing by the management service a network-accessible user interface;
responsive to a user login to the user interface, the user login corresponding to a user account associated with the aerosol delivery device, presenting one or more selected from the group comprising: access to at least a subset of the collected data received from the aerosol delivery device; and access to settings setting controls configured to generate update data for the aerosol delivery device in relation to a change to any settings received from the controls.

21. The method of claim 18, wherein each aerosol delivery device comprises an electronic nicotine delivery "END" device.

* * * * *